United States Patent [19]

Ikegaya

[11] Patent Number: 5,251,044
[45] Date of Patent: Oct. 5, 1993

[54] FACSIMILE APPARATUS FOR ACCOUNTING FOR SUPPLIES USED IN RECEIVING FACSIMILE TRANSMISSIONS

[75] Inventor: Tadahiko Ikegaya, Saitama, Japan
[73] Assignee: Fuji Xerox Co., Ltd., Tokyo, Japan
[21] Appl. No.: 750,479
[22] Filed: Aug. 27, 1991

[30] Foreign Application Priority Data

Oct. 24, 1990 [JP] Japan .................. 2-284380

[51] Int. Cl.⁵ .............................. H04N 1/00
[52] U.S. Cl. ..................... 358/440; 358/402
[58] Field of Search ............... 358/402–403, 358/440

[56] References Cited

U.S. PATENT DOCUMENTS 4,901,367 2/1990 Nicholson ................. 358/403
4,994,926 2/1991 Gordon et al. ............. 358/402

FOREIGN PATENT DOCUMENTS 62-227262 10/1962 Japan .
56-10773 2/1981 Japan .
58-133073 8/1983 Japan .

*Primary Examiner*—Stephen Brinich
*Attorney, Agent, or Firm*—Finnegan, Henderson, Farabow, Garrett & Dunner

[57] ABSTRACT

An amount of an expendable supply, e.g., recording sheets, of a facsimile machine consumed in each reception of transmission is detected, and accumulated/stored for each user based on a sub-address included in a SETUP sent from a caller. Consumption amounts of a plurality of expendable supplies may be detected and accumulated/stored for each item of the supplies.

3 Claims, 3 Drawing Sheets

| SECTION NO. | SUB-ADDRESS | NUMBER OF A3 SHEETS | NUMBER OF B4 SHEETS | NUMBER OF A4 SHEETS |
|---|---|---|---|---|
| 0 |  | 10 | 5 | 2 |
| 1 | 5111 | 4 | 2 | 2 |
| 2 | 5112 | 5 | 3 | 1 |
| ⋮ | ⋮ | ⋮ | ⋮ | ⋮ |
| n | 600 | 8 | 2 | 3 |

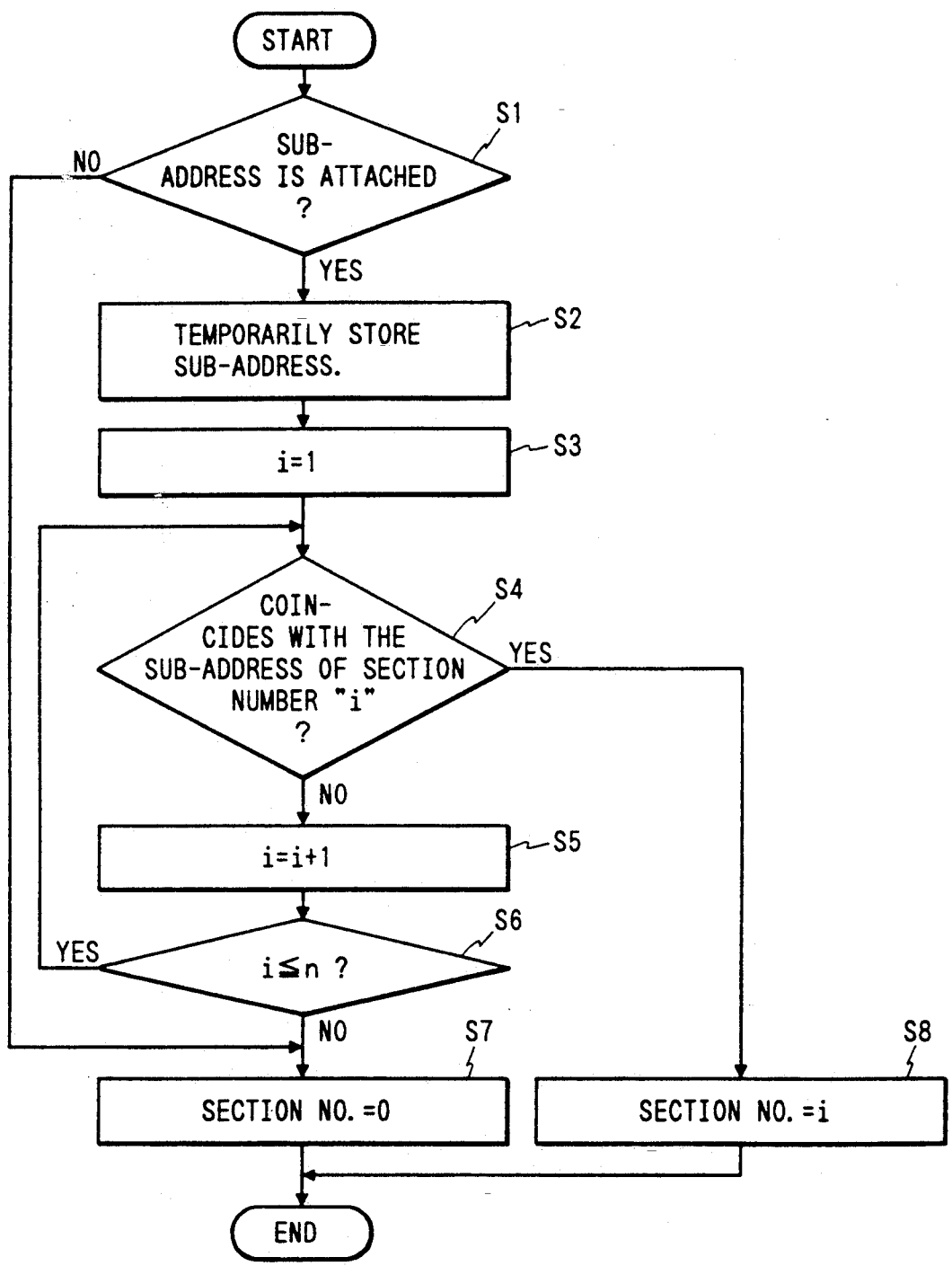

FACSIMILE APPARATUS FOR ACCOUNTING FOR SUPPLIES USED IN RECEIVING FACSIMILE TRANSMISSIONS

BACKGROUND OF THE INVENTION

The present invention relates to a facsimile machine and, more specifically, relates to a facsimile machine that can provide a charge management system in which beneficiaries are charged costs of expendable supplies in accordance with the amounts they have spent.

Conventionally, where one facsimile machine is commonly used by a plurality of business sections, there has been a problem of how to share the related expenses. There are known the following patent documents which describe techniques for sharing such expenses.

(1) Japanese Unexamined Patent Publication No. Sho. 56-10773: A key counter is activated when document information is received by a facsimile machine. Since the key counter has functions of starting the facsimile machine and accumulating the charge, the communication costs can be shared by beneficiaries.

There also exists a technique which employs a magnetic card as a key. Copying and transmission operations are prohibited unless the card is set into the machine. If the card is properly set, the number of copied sheets or the communication charge are registered in association with a business section number recorded in the card being set into the machine.

(2) Japanese Unexamined Patent Publication No. Sho. 58-133073: A sender is charged for the communication time of image information and for the quantity of recording sheets he has spent. Where a direct mail is sent through a facsimile machine, a sender is charged for recording sheets consumed.

(3) Japanese Unexamined Patent Publication No. Sho. 62-227262: Communication costs are distributed to users in a facsimile machine connected to an ISDN network.

Except for special cases of, e.g., the direct mail as described in above item (2), it would be appropriate that when information is received by a facsimile machine, costs of expendable supplies, such as recording sheets, of the receiving-side facsimile machine be paid by a receiver. However, in the prior art as described above, the costs for the expendable supplies cannot be distributed to receivers. That is, the expenditures of a facsimile machine cannot be shared in a correct manner.

SUMMARY OF THE INVENTION

The present invention has been made in consideration of the above problems of the prior art and, therefore, an object of the invention is to provide a facsimile apparatus in which costs of expendable supplies of a receiving-side facsimile apparatus can be shared by related beneficiaries in a correct manner.

According to the present invention, a facsimile apparatus connected to an ISDN network comprises:

means for identifying a receiver based on a called party sub-address or called party number transmitted from a caller;

means for storing an accumulated consumption amount of an expendable supply of the facsimile apparatus for each of users who have own called party sub-addresses or called party numbers;

means for detecting a consumption amount of the expendable supply consumed in each reception of transmission; and means for renewing the accumulated consumption amount of the identified receiver based on the detected consumption amount.

BRIEF DESCRIPTION OF THE DRAWINGS

FIG. 3 shows an example of a charge table;

FIGS. 4 and 5 are flow charts showing the operations of the system control unit.

DESCRIPTION OF THE PREFERRED EMBODIMENT

An embodiment of the present invention will be described hereinafter with reference to the accompanying drawings.

Figure 2:
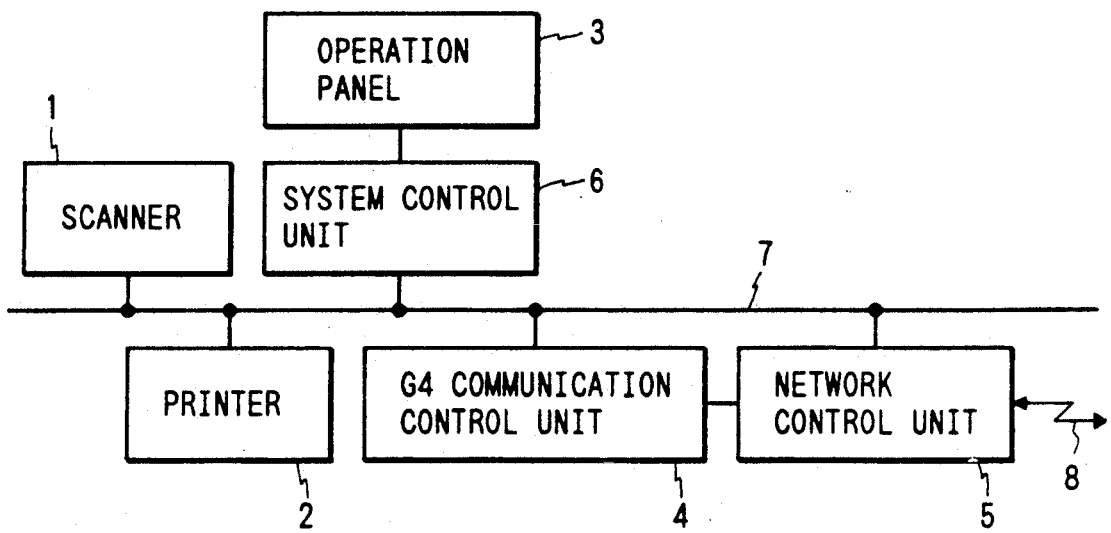
FIG. 2 is a block diagram outlining the construction of the facsimile machine according to the embodiment.

FIG. 2 outlines the construction of a facsimile machine according to the embodiment. In FIG. 2, reference numeral 1 represents a scanner for reading a document to be transmitted; 2, a printer for printing a received document; 3, a operation panel including keys to be operated by an operator such as a ten-key pad, abbreviation keys and various function keys, a display, etc.; 4, a G4 communication control unit for controlling G4 facsimile communication; 5, a network control unit for controlling an ISDN network 8; and 6, a system control unit for controlling the units connected to a bus 7.

The present invention is directed to G4 facsimile machines connected to the ISDN network 8. Therefore, as is known in the art, when a caller wants to specify a receiver, he can call the receiver's facsimile machine by attaching to the telephone number of the machine a called party sub-address or called party number allocated to the receiver. The called party sub-address or called party number is detected by the network control unit 5.

The present invention utilizes this called party sub-address or called party number (hereinafter referred to as "sub-address") to make it possible to properly charge beneficiaries of costs of expendable supplies of a receiving-side facsimile machine.

Figure 1:
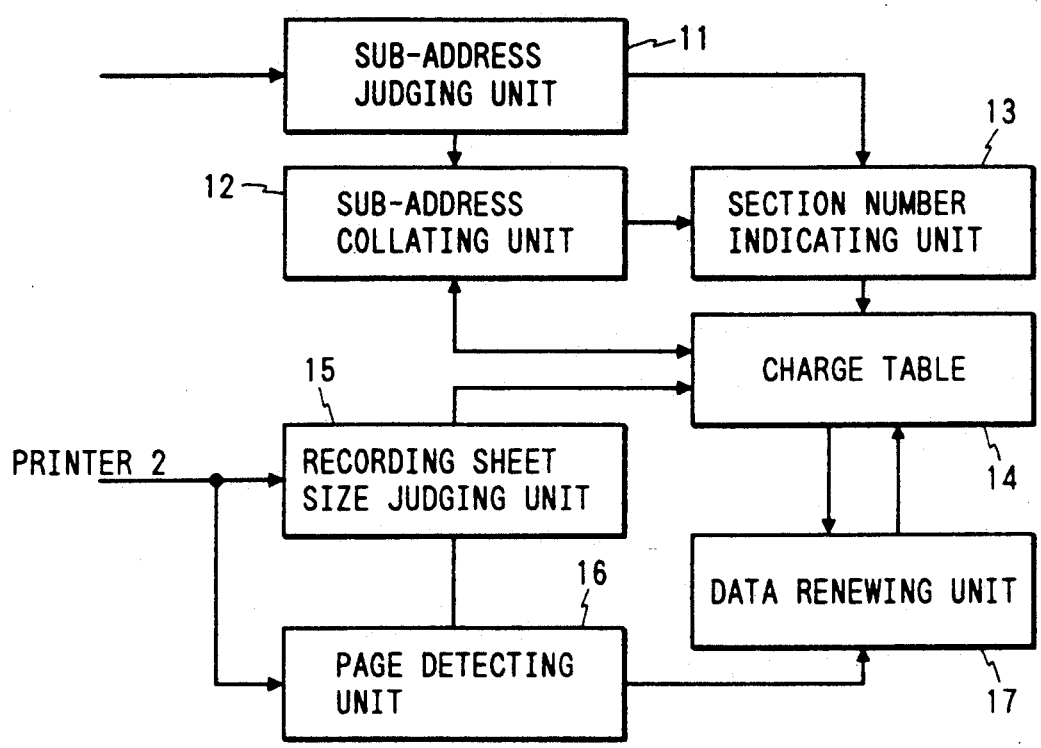
FIG. 1 is a block diagram showing functions of a system control unit of a facsimile machine according to an embodiment of the present invention.

FIG. 1 is a block diagram showing functions of the system control unit 6. In FIG. 1, reference numeral 11 represents a sub-address judging unit for detecting a SETUP sent from a caller and judging whether the SETUP includes a sub-address; 12, a sub-address collating unit for judging whether the detected sub-address provided from the sub-address judging unit coincides with one of sub-addresses registered in a charge table 14; 13, a section number indicating unit for indicating a section number "0" when the sub-address judging unit 11 has judged that no sub-address is attached to the SETUP, and indicating a particular section number corresponding to the detected sub-address when the sub-address collating unit 12 has found the coincidence. When the sub-address judging unit 11 has found the attachment of a sub-address but it is judged by the sub-address collating unit 12 that the detected sub-address does not coincide with any of the registered sub-addresses, the section number indicating unit 13 also indicates the section number "0".

Figures 3, 5:
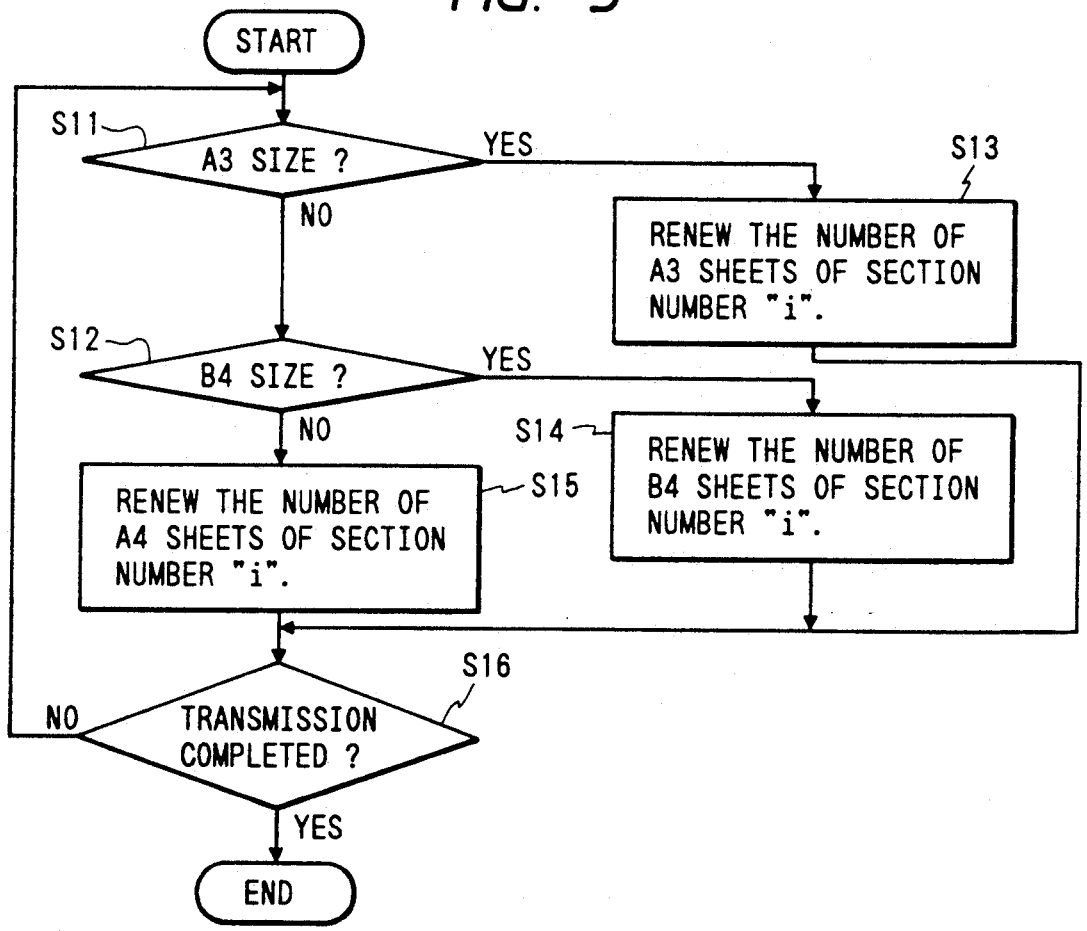

As shown in FIG. 3, the charge table 14 includes the columns of section number, sub-address, the number of A3 sheets, the number of B4 sheets, the number of A4 sheets. In the present embodiment, the section number "0" represents the cases where no business section is specified, and the section numbers 1, 2, ...., n represent respective specified sections, for example, the first section, second section, .... of the general affairs department. The columns of the number of A3 sheets, B4 sheets and A4 sheets denote the numbers of consumed sheets of the respective sizes.

Again referring to FIG. 1, reference numeral 15 represents a recording sheet size judging unit for judging the size of a recording sheet based on a size signal provided from the printer 2. A page detecting unit 16 detects the completion of a printing operation. A data renewing unit 17 adds data of the one sheet detected by the page detecting unit 16 to the sheet number data stored in an area of the charge table 14, which has been specified by the section number indicating unit and the recording sheet size judging unit 15, and stores a result of the addition into the same area. That is, the data reviewing unit updates consumption information stored in the charge table 14.

The operation of the embodiment will be described with reference to FIGS. 1, 4 and 5. FIGS. 4 and 5 are flow charts showing the operations of determining one of the section numbers registered in the charge table 14, and of renewing the number of consumed recording sheets, respectively.

Referring to FIG. 4, first in step S1, it is judged whether a SETUP sent from a caller includes a sub-address. If a judgment result is negative, the flow proceeds to step S7 where a section number is determined as "0". The section number "0" indicates that no specific receiver is addressed.

On the other hand, the result in step S1 is affirmative, the sub-address is temporarily stored in step S2. After the numeral "1" is substituted for "i" in step S3, it is judged in step S4 whether the received sub-address coincides with the sub-address of a section number "i". If a judgment result in step S4 is negative (non-coincidence), the flow proceeds to step S5 where "1" is added to "i". Then, in step S6, it is judged whether "i" satisfies the condition $i \leq n$. If a result is affirmative, the flow returns to step S4 where it is again judged whether the sub-address stored in step S2 coincides with a new section number (i+1).

If a judgement result in step S4 becomes affirmative after repetition of some times, the flow proceeds to step S8 where it is determined that the address from the caller is the section having the section number "i". On the other hand, if a judgment result in step S6 becomes negative, which means that the charge table 14 does not have a section number corresponding to the sub-address sent from the caller, the section number is determined as "0".

The section number is determined by the above operation, and the section number indicating unit 13 informs the charge table 14 of the determined section number.

Next, the operation of renewing the number of consumed sheets will be described with reference to FIG. 5.

First, it is judged whether the printer 2 has printed information on an A3-sized sheet (step S11) and whether on a B4-sized sheet (step S12). If an A3-sized sheet was used, the flow proceeds to step S13 where the number of A3 sheets for the section number "i" is renewed. In the case of a B4-sized sheet, the flow proceeds to step S14 where the number of B4 sheets for the section number "i" is renewed. If judgment results in steps S11 and S12 are both negative, which means the sheet size should be A4, the flow proceeds to step S15 where the number of A4 sheets is renewed.

In step S16, it is judged whether the transmission has been completed. If a judgment result is negative, the flow returns to step S11 to repeat the same operation as described above.

As a result of the above operations, the number of recording sheets consumed in receiving certain document information can be stored in the area corresponding to the business section to which the information was transmitted. Therefore, in counting charges for use of a facsimile machine, costs of recording sheets are calculated by multiplying a cost per sheet by the number of consumed sheets which is stored on the charge table 14, and then are charged to the respective business sections.

The above description is devoted to recording sheets. However, costs of other expendable supplies such as a toner can also be shared by related beneficiaries by charging them in accordance with the respective numbers of recording sheets they have spent.

As described above, according to the present invention, even where one facsimile machine is commonly used by a plurality of business sections, costs of expendable supplies such as recording sheets can be distributed, in a correct manner, to the respective sections in accordance with quantities of transmission they received.

What is claimed is:

1. A facsimile apparatus connected to an ISDN network for use by a plurality of users having associated party sub-addresses or party numbers, comprising:
    means for identifying a user in receipt of a facsimile transmission received by the facsimile apparatus based on a called party sub-address or called party number transmitted from a caller;
    means for storing an accumulated consumption amount of an expandable supply of the facsimile apparatus for each of the users receiving facsimile transmission from a caller;
    means for detecting a consumption amount of the expendable supply consumed in connection with each facsimile transmission received by the facsimile apparatus; and
    means for updating the accumulated consumption amount of the identified user in receipt of the facsimile transmission based on the detected consumption amount.

2. A facsimile apparatus connected to an IDSN network for use by a plurality of users having associated party sub-addresses or party numbers, comprising:
    means for identifying a user in receipt of a facsimile transmission received by the facsimile apparatus based on a called party sub-address or called party number transmitted from a caller;
    means for storing respective accumulated consumption amounts of a plurality of expendable supplies of the facsimile apparatus for each of the users receiving facsimile transmissions from a caller;
    means for detecting a kind of the plurality of expendable supplies and a consumption amount of the detected kind consumed in connection with each facsimile transmission received by the facsimile apparatus; and means for updating the accumulated consumption amount of the detected kind and of the identified user in receipt of a facsimile transmission received by the facsimile apparatus based on the detected consumption amount.

3. The facsimile apparatus according to claim 1 or 2, wherein when no called party sub-address or called party number is transmitted, the updating means updates the accumulated consumption amount of a sub-address or number representing receiver-unspecified transmission.

* * * * *